United States Patent
Ota et al.

(10) Patent No.: US 7,484,679 B2
(45) Date of Patent: Feb. 3, 2009

(54) METHOD OF MILLING CERIUM COMPOUND BY MEANS OF BALL MILL

(75) Inventors: Isao Ota, Nei-gun (JP); Kenji Tanimoto, Nei-gun (JP); Gen Yamada, Nei-gun (JP); Noriyuki Takakuma, Nei-gun (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 643 days.

(21) Appl. No.: 10/518,769

(22) PCT Filed: Jul. 3, 2003

(86) PCT No.: PCT/JP03/08475

§ 371 (c)(1),
(2), (4) Date: Dec. 21, 2004

(87) PCT Pub. No.: WO2004/004910

PCT Pub. Date: Jan. 15, 2004

(65) Prior Publication Data

US 2005/0253001 A1 Nov. 17, 2005

(30) Foreign Application Priority Data

Jul. 4, 2002 (JP) ............................. 2002-195742

(51) Int. Cl.
*B02C 1/00* (2006.01)
*B02C 11/08* (2006.01)
*B02C 21/00* (2006.01)
*B02C 23/00* (2006.01)

(52) U.S. Cl. ........................................ 241/21; 241/184
(58) Field of Classification Search ................... 241/21, 241/30, 184
See application file for complete search history.

(56) References Cited

U.S. PATENT DOCUMENTS

| 3,337,300 | A | * | 8/1967 | Hughes | 423/610 |
| 3,591,362 | A | * | 7/1971 | Benjamin | 428/570 |
| 4,175,117 | A | * | 11/1979 | Hill | 423/594.1 |
| 4,603,814 | A | * | 8/1986 | Mehltretter et al. | 241/30 |
| 4,801,100 | A | * | 1/1989 | Orlando | 241/171 |
| 4,887,773 | A | * | 12/1989 | Mehltretter | 241/171 |
| 6,491,239 | B2 | * | 12/2002 | Blanton et al. | 241/21 |

FOREIGN PATENT DOCUMENTS

| JP | A 2000-109808 | 4/2000 |
| JP | A 2002-186870 | 7/2002 |
| JP | A 2002-212544 | 7/2002 |

OTHER PUBLICATIONS

Patton, "Paint Flow and Pigment Dispersion," pp. 202-222, 1971.
Kano et al., Chemical Equipment, No. 9, pp. 50-54, 2001.

* cited by examiner

*Primary Examiner*—Bena Miller
(74) *Attorney, Agent, or Firm*—Oliff & Berridge, PLC

(57) ABSTRACT

A method of milling cerium compound by means of a ball mill using a milling medium, characterized in that ratio $H_b/r$ of radius r of a cylindrical ball mill container and depth $H_b$ of the milling medium in the ball mill container disposed horizontally ranges from 1.2 to 1.9, and the ball mill container is rotated at a rotational speed which is 50% or less of critical rotational speed $N_c=299/r^{1/2}$ of the ball mill container converted from the radius r expressed in centimeter. The milling method can be carried out in a wet or dry process, and the cerium compound is preferably cerium oxide. The method can be also applied for producing a cerium compound slurry.

11 Claims, No Drawings

METHOD OF MILLING CERIUM COMPOUND BY MEANS OF BALL MILL

TECHNICAL FIELD

The present invention relates to a method appropriate for milling cerium oxide particles by means of a ball mill.

BACKGROUND ART

Physical factors dominating milling effect of ball mill milling equipments include dimension (radius r) and rotational speed rpm in regard to a ball mill container. In regard to beads, amount of filled beads (this is expressed in ratio $H_b/r$ of depth $H_b$ of filled beads to radius r (cm) of the ball mill container, or the ratio of the beads to the internal volume of the container), or material, diameter and shape (spherical, cylindrical, etc.) of the beads may be mentioned. Among these physical factors, it is known that consumption power becomes maximum and the best milling efficiency is obtained in case where the amount of filled beads which is expressed in $H_b/r$ is 1.0 (corresponds to 50% based on the internal volume of the ball mill container).

However, in case where the amount of filled beads is as little as 30% or less ($H_b/r$ of 0.6 or less), the balls start to slide along the inner wall of the container to cause remarkable damages to the inner wall. Therefore, in the actual production process, the amount of beads is generally kept to one third to half of the total volume of the ball mill container ($H_b/r$ of 0.66 to 1.0).

In the milling by a ball mill, the balls are gradually lifted highly in the rotational direction with the movement of the mill, and the ball is involved in a snowslide motion together with a plenty of balls when the balls are lifted at the position where there is no support below the balls. Consequently, the balls slide and fall on the surface of the balls and fall below the mill while they collide here and there (snowslide phenomenon).

When the rotational speed is increased, the balls come to fall like a waterfall in the space filled with vapor, rather than the snowslide phenomenon (waterfall phenomenon).

When the rotational speed is further increased, the mill comes to be rotated while the balls are adhered to the inner wall of the mill due to centrifugal force (adhesion phenomenon/adhesion state).

It is clear that no dispersion is achieved in the adhesion state (the balls do not move relatively with the mill). In addition, in the state of the waterfall phenomenon, the balls and the inner wall of the mill have many damages, and dispersion is insufficient. Therefore, these phenomena are undesirable states, and the dispersion of pigments is carried out very efficiently in only the state of snowslide phenomenon which is regarded as an ideal state.

In regard to the rotational speed of the container, it is stated that the optimum rotational speed $N_0=(203-0.60r)/r^{1/2}$ wherein the unit of r is cm ($RPM_0=(37-3.3r)/r^{1/2}$ wherein the unit of r is feet) at the point of which the snowslide phenomenon occurs is an ideal state in the milling by a ball mill (see, for example "Paint Flow and Pigment Dispersion" written by Temple V. Patton, translation supervised by Kenji Ueki., Kyoritsu Shuppan Co., Ltd., 1971, pp. 202-222). This publication states that the above-mentioned equation expressing the optimum rotational speed $N_0$ at the point of which the snowslide phenomenon occurs is obtained in case where the critical rotational speed $N_c=60g^{1/2}/2\pi r^{1/2}=299/r^{1/2}$, and is derived from $N_0=(0.68-0.22r)N_c$ ($rpm_0=(0.68-0.06r)rpm_c$ wherein the unit of r is feet). In addition, the publication states that the actual production process is generally carried out in the amount of filled beads and the rotational speed of the container as mentioned above.

In addition, it is stated that the milling of aluminum hydroxide powder is carried out in a ball mill made of stainless steel having a diameter of 78 mm to 199 mm by means of steel beads having a diameter of 10.2 mm (see, for example, "Chemical Equipment" written by Sumiya Kano, Hiroshi Mio and Fumiyoshi Saito, 2001, No. 9, pp. 50-54). This publication reports the test results in which the milling condition is as follows: bead-filling rate of 20 to 80% and number of revolutions of 0.6 to 1.3 time the critical rotational speed. As a result of it, it is stated that milling rate becomes maximum when the bead-filling rate is 40 to 80% and number of revolutions is 80% of the critical rotational number, and the milling rate is increased with an increase in bead diameter, and the milling rate is lowered when the bead-filling rate is beyond 60%.

In the meanwhile, cerium oxide particles are widely used as polishing agent for substrates containing silica as main component, and recently there is a strong demand for cerium oxide polishing agent by which a polished face with a high quality can be obtained without surface defects such as scratch. On the other hand, it is also required strongly to maintain a high removal rate so as not to decrease the productivity. Therefor unmilled large particles causing scratch and over-milled fine particles causing a lowering in removal rate must be reduced in the number in cerium oxide particles to the utmost. That is, it is required a production method by which the particle size distribution of cerium oxide particles can be controlled in order to make it further sharp.

Cerium oxide particles have been finely divided by milling with ball mill using a milling medium such as partially stabilized zirconia oxide beads or alumina beads. However, as these beads are very hard for cerium oxide and milling condition which is generally achieved for milling it is too vigorous, particle size distribution of cerium oxide fine particles becomes very broad.

The present invention resolves this problem and provides a milling method for obtaining cerium oxide particles with a narrow particle size distribution. The cerium oxide particles obtained according to the present invention have a narrow particle size distribution. Therefore, in case where it is used for polishing, it provides a polished face with a high quality without lowering in removal rate, and thus it makes possible to improve the production efficiency and lower the cost.

DISCLOSURE OF INVENTION

The present invention includes the following aspects:

as a first aspect, a method of milling cerium compound by means of a ball mill using a milling medium, characterized in that ratio $H_b/r$ of radius r of a cylindrical ball mill container and depth $H_b$ of the milling medium in the ball mill container disposed horizontally ranges from 1.2 to 1.9, and the ball mill container is rotated at a rotational speed which is 50% or less of critical rotational speed $N_c=299/r^{1/2}$ of the ball mill container converted from the radius r expressed in centimeter;

as a second aspect, the method of milling cerium compound as set forth in the first aspect, wherein the milling of the cerium compound is carried out in wet process or dry process;

as a third aspect, the method of milling cerium compound as set forth in the first aspect, wherein the cerium compound is cerium oxide;

as a fourth aspect, the method of milling cerium compound as set forth in the first aspect, wherein the ball mill container is rotated at a rotational speed which is 10% or more of $N_c$;

as a fifth aspect, the method of milling cerium compound as set forth in the first aspect, wherein the radius r of the ball mill container is 5 to 50 cm;

as a sixth aspect, the method of milling cerium compound as set forth in the first aspect, wherein the milling medium is partially stabilized zirconia ball;

as a seventh aspect, the method of milling cerium as set forth in the first aspect, wherein the milling medium has a diameter of 0.3 to 25 mm;

as an eighth aspect, the method of milling cerium compound as set forth in the first aspect, wherein zirconium is used in an amount of 100 ppm to 10000 ppm based on the cerium compound in terms of cerium (IV) oxide;

as a ninth aspect, the method of milling cerium compound as set forth in the first aspect, wherein a water-soluble alkaline silicate is added, pH of a slurry containing the cerium compound is adjusted to 8 to 13, and then a wet milling is carried out to obtain cerium compound covered with amorphous silica;

as a tenth aspect, the method of milling cerium compound as set forth in the ninth aspect, wherein the water-soluble alkaline silicate is lithium silicate, sodium silicate, potassium silicate or quaternary ammonium hydroxide silicate; and as an eleventh aspect, a method of producing a slurry of cerium compound from an aqueous or organic solvent medium containing cerium compound by means of a ball mill using a milling medium, characterized in that ratio $H_b/r$ of radius r of a cylindrical ball mill container and depth $H_b$ of the milling medium in the ball mill container disposed horizontally ranges from 1.2 to 1.9, and the ball mill container is rotated at a rotational speed which is 50% or less of critical rotational speed $N_c=299/r^{1/2}$ of the ball mill container using the radius r expressed in centimeter.

BEST MODE FOR CARRYING OUT THE INVENTION

The present invention relates to a method of milling cerium compound by means of a ball mill using a milling medium, characterized in that ratio $H_b/r$ of radius r of a cylindrical ball mill container and depth $H_b$ of the milling medium in the ball mill container disposed horizontally ranges from 1.2 to 1.9, and the ball mill container is rotated at a rotational speed which is 50% or less of critical rotational speed $N_c=299/r^{1/2}$ of the ball mill container converted from the radius r expressed in centimeter.

The present invention may be carried out by milling powdery cerium compound in dry process, or milling an aqueous or organic solvent medium containing cerium compound in wet process.

That is, in the wet process, a slurry of cerium compound can be produced according to a method of producing a slurry of cerium compound from an aqueous or organic solvent medium containing cerium compound by means of a ball mill using a milling medium, wherein ratio $H_b/r$ of radius r of a cylindrical ball mill container and depth $H_b$ of the milling medium in the ball mill container disposed horizontally ranges from 1.2 to 1.9, and the ball mill container is rotated at a rotational speed which is 50% or less of critical rotational speed $N_c$ of the ball mill container using the radius r expressed in centimeter.

In the present invention, cerium oxide is preferably used as cerium compound. Cerium oxides to be placed in a ball mill container with a polishing medium are cerium oxide particles with a particle diameter of 0.1 μm or more, preferably 0.1 to 100 μm obtained by calcining commercially available cerium carbonate in a shape of hexagonal plate of several to ten-odd μm at 400 to 1200° C. In addition, commercially available cerium oxide powders with a mean particle diameter of 1 μm or less or several μm can be also used.

In the meanwhile, cerium compounds are not limited to cerium oxides, and water-insoluble cerium compound such as cerium carbonate can be used.

As the potential of beads risen up by rotation of a ball mill container becomes high with an increase in the radius of the ball mill container, and the striking energy due to free fall thereof becomes high, fine particles are apt to be obtained by over-milling. When cerium compound, for example relatively soft material such as cerium oxide is milled with a relatively hard medium such as zirconia, the range of the above-mentioned radius r is important. The ball mill container used in the present invention preferably has the radius r ranging from 5 to 25 cm.

The amount of filled beads is set in such a way that ratio $H_b/r$ of depth $H_b$ of the filled beads to radius r of the ball mill container ranges from 1.2 to 1.9 (63 to 97% based on the inner volume), which is a higher value than case where general milling by means of a ball mill (for example, $H_b/r$ ranges from 0.63 to 1.0, 33 to 50% based on the inner volume) is carried out. This makes it possible to mill in a condition which does not occur a situation where snowslide phenomenon is repeated, wherein the situation is regarded as an ideal condition in general powder-milling.

When $H_b/r$ is set within the range from 1.2 to 1.9, material to be milled (cerium compound in a dry-milling, an aqueous or organic solvent slurry containing cerium compound in wet-milling) that is placed with a milling medium in a ball mill, is placed in an amount of the milling medium:the material to be milled of 1:0.5 to 1:1.2 in volume ratio. When the milling medium and the material to be milled are placed in this ratio in a ball mill container, the combined volume of both amounts to 65 to 99.5% based on the total volume. The slurry to be milled is a slurry containing cerium compound in an aqueous or organic solvent in a solid concentration of 1 to 70% by weight.

In addition, the rotational speed of the ball mill container is 50% or less of critical rotational speed, and 80% or less of the optimum rotational speed $N_o=(203-0.60r)/r^{1/2}$ that occurs a snowslide phenomenon by which dispersion is efficiently achieved. Thus, the present invention excludes a condition occurring a situation where snowslide phenomenon of beads is repeated, wherein the situation is regarded as an ideal condition in general powder-milling.

In the present invention, milling is achieved within the range of 10% to 50% of the critical rotational speed $N_c$. The rotational speed correspond to a rotational speed ranging from 20% to 80% of the optimum rotational speed $N_o=(203-0.60r)/r^{1/2}$ at which a snowslide phenomenon occurs. As mentioned above, the present invention provides cerium compounds, particularly cerium oxide particles having a narrow particle size distribution by selecting a condition out of the milling condition which it is generally regarded that milling is achieved in the highest effect. Further, the wet milling can provide cerium oxide slurry.

As mentioned above, the milling of cerium compound in the present invention utilizes milling media having small particle diameter and is carried out in a low rotational speed of a ball mill, compared with the optimum milling condition that is normally applied for particles. This make it possible to narrow the particle size distribution of cerium compound, particularly cerium oxide when it is milled.

In a process using a sand grinder or an attritor in which beads are compulsorily rotated with an arm or disc, the milling is carried out in the condition of ratio $H_b/r$ of depth $H_b$ of the filled beads to radius r of the ball mill container ranging from 1.2 to 1.9 (63 to 97% based on the inner volume). However, it is difficult to avoid partial over-milling due to a compulsory rotation of the milling media. Therefore, a large amount of fine particles are produced, and it is difficult to obtain cerium oxide particles with a sharp particle size distribution.

When the radius r of the ball mill container is over 50 cm, the potential energy of beads risen up thereby becomes high, and the striking energy thereof becomes high due to free fall. Therefore, it is not preferable as over-milling occurs and the particle size distribution of the resulting milled particles becomes broad. On the other hand, when the radius r of the container is less than 5 cm, it is not preferable as milled amount per batch is too small and the cost becomes very high. Consequently, the radius r of the container preferably ranges from 5 cm to 50 cm, more preferably from 10 cm to 40 cm.

When the ratio $H_b/r$ of depth $H_b$ of filled beads to radius r of a cylindrical ball mill container is over 1.9 (97% based on the inner volume), it is not economical as milling speed is markedly lowered. The ratio $H_b/r$ of depth $H_b$ of filled beads to radius r of a cylindrical ball mill container is preferably 1.2 to 1.9 (the amount of filled beads is 63 to 97% based on the inner volume), further it is more preferable that $H_b/r$ is 1.2 to 1.7.

The material of beads is preferably partially stabilized zirconia, alumina, mulite or silica, which is harder than cerium oxide. Among them, partially stabilized zirconia that little beads are worn out is most preferable.

The size of beads is preferably 0.3 to 25 mm$\phi$. When the size of beads is less than 0.3 mm$\phi$, its own weight of beads becomes too light, and milling efficiency is markedly lowered. On the other hand, when the size of beads is more than 25 mm$\phi$, the striking energy of beads each other becomes high, and over-milling occurs locally and fine particles are easily produced.

In case where milling is achieved by using partially stabilized zirconia, it is not possible to avoid contamination of zirconium element in a slurry of cerium compound after milling. When the cerium compound is cerium (IV) oxide, zirconium element is contaminated in an amount of 100 ppm to 10000 ppm based on cerium (IV) oxide. But the element is present in the shape of zirconia fine particle, the element itself can be utilized as polishing agent.

The method of milling cerium compound according to the present invention, particularly the method for producing cerium oxide particles can be applied for wet milling or dry milling.

In the wet process, acid such as nitric acid, hydrochloric acid, acetic acid or the like can be used as a water-soluble dispersant. In the meantime, the wet milling for a long time causes a rise in pH of an acid slurry, the pH approaches 5 that is the isoelectric point of cerium (IV) oxide. Therefore, the slurry is liable to be aggregated and lowered in grindability.

Thus, in the process of wet milling in the present invention, a water-soluble alkaline dispersant containing silica is added to cover cerium (IV) oxide particles with amorphous silica, and the resulting slurry is adjusted to pH 8-13 that is higher than the isoelectric point of cerium (IV) oxide. Thereby, cerium (IV) oxide particles are charged negatively, and the slurry is always kept in a dispersed state, and homogeneous wet milling can be carried out for a long time. The water-soluble alkaline dispersant containing silica includes a water-soluble alkaline silicate or silica sol, such as lithium silicate, sodium silicate, potassium silicate, quaternary ammonium hydroxide silicate, and can be added in an amount of 0.001 to 1 in a weight ratio of $(SiO_2)/(CeO_2)$.

The material of the ball mill container according to the present invention includes metal such as stainless steel, iron or the like, ceramics such as alumina, mulite or the like, resin such as nylon, polyethylene, polypropylene, engineering plastics or the like. Containers made of resin are preferable taking contamination of impurities on milling or hardness of material into account.

Cerium compounds obtained according to the present invention have the particle diameter measured by centrifugal sedimentation method ranging from 50 to 600 nm, and have a low rate of large particles over 400 nm in the whole particles compared with those of the prior milling method. Further, the cerium compounds have also a low rate of fine particles less than 30 nm in the whole particles. Consequently, the present invention can provide cerium compound particles with a narrow particle size distribution.

In case where milling is carried out in the wet process, cerium compound slurry that contains cerium compound with the above-mentioned particle diameter and particle size distribution in concentration of 10 to 60% by weight and that has pH of 3 to 11 is obtained by milling cerium compound in concentration of 10 to 60% by weight with an aqueous medium of pH 3-11 for 1 to 72 hours. Particularly, it is useful for producing cerium oxide slurry from an aqueous medium containing cerium oxide.

EXAMPLES

Hereinafter, the present invention is described based on examples. The analytical methods adopted in the examples are as follows.

(1) pH Measurement

A pH meter (manufactured by To a DKK Ltd., HM-30S) was used for pH measurement.

(2) Conductivity Measurement

A conductivity meter (manufactured by To a DKK Ltd., CM-30S) was used for conductivity measurement.

(3) Measurement of Particle Diameter by Centrifugal Sedimentation Method

A mean particle diameter of D50 was measured with a particle diameter measurement apparatus by centrifugal sedimentation method (manufactured by Shimadzu Corporation, CP-3), and it was regarded as a particle diameter based on centrifugal sedimentation method.

(4) Measurement of Particle Diameter by Laser Diffraction Method

A mean particle diameter of D50 was measured with a particle diameter measurement apparatus by laser diffraction method (manufactured by Malvern Instruments Ltd., Mastersizer 2000), and it was regarded as a mean particle diameter based on laser diffraction method.

(5) Particle Diameter Determined from Specific Surface Area Measured by Gas Adsorption Method A sample obtained by drying a cerium oxide aqueous slurry in a prescribed condition was subjected to a specific surface area analyzer by nitrogen adsorption (manufactured by Quantachrome Instruments, Monosorb Type MS-16) to measure the specific surface area Sw ($m^2/g$), and a particle diameter in terms of spherical particle (particle diameter calculated through BET method) was determined.

(6) Measurement Method of Amount of Small Particles

In 50 ml centrifugal tube, 37 g of milled slurry obtained by diluting to 17% by weight of solid content with pure water was placed, the tube was centrifuged at 3000 rpm (G=1000) for 10 minutes, and then 22.5 g of supernatant was taken, and dried at 110° C. to obtain powder. An amount of small particles was determined by dividing the weight of the resulting powder by the weight of solid content in the slurry prior to centrifugation. The small pailicles were those less than 30 nm according to an observation with transmission electron microscope.

(7) Measurement Method of BET Method-Based Particle Diameter of Large Particles

In 100 ml glass sedimentation tube, 115 g of milled slurry obtained by diluting to 15% by weight of solid content with pure water was placed, and after one day, 2 ml of slurry was recovered from the bottom. After drying the recovered slurry in a prescribed condition, the specific surface area was measured similarly to the procedure in (4) and the particle diameter based on BET method was calculated, and it was regarded as particle diameter calculated through BET method (BET method-based particle diameter) of large particles.

(8) Observation with Scanning Electron Microscope

An electron microscopic photograph of a sample to be observed was taken with a scanning electron microscope (manufactured by JEOL Ltd., FE-SEM S-4100), and the resulting photograph was observed.

(9) Measurement of Powder X-Ray Diffraction

A X-ray diffraction apparatus (manufactured by JEOL Ltd., JEOL JDX-8200T) was used for measurement of powder X-ray diffraction.

(10) Measurement of Isoelectric Point of Cerium (IV) Oxide

A slurry containing cerium (IV) oxide in 1% by weight was prepared, and the isoelectric point thereof was measured with Zetasizer HS 3000 (manufactured by Malvern Instruments Ltd.)

(11) Measurement of Removal Rate of Thermal Oxidation Layer

Film thickness of thermal oxidation layer was measured with a film thickness analyzer NanoSpec (manufactured Nanometrics Incorporated) before and after polishing, and removal rate was determined.

Example 1

150 kg of commercially available cerium oxide having bar-shaped particles of 0.2 to 3 μm with an observation by a scanning electron microscope, mean particle diameter based on laser diffraction of 3.2 μm and a specific surface area based on BET method of 128 m$^2$/g was calcined in 1 m$^3$ gas calcination furnace at 1100° C. for 5 hours to obtain yellow-white powder. The resulting powder was measured with X-ray diffraction apparatus and main peaks were detected at diffraction angle 2θ=28.6°, 47.5° and 56.4° which were consistent with characteristic peaks of cubic system crystalline cerium oxide described in ASTM card 34-394. An observation with a scanning electron microscope revealed that the calcined cerium oxide powder was aggregated particles having a primary particle diameter of 150 to 300 nm. In addition, the specific surface thereof was 2.8 m$^2$/g.

Partially stabilized zirconia beads of 1 mmφ were placed in an amount of 59 kg in a polyethylene container having a dimension of radius 15 cm×length 34 cm (in this point, H$_b$/r=1.4, amount of filled beads was 71%), and further 5.9 kg of the cerium oxide powder obtained by calcination at 1100° C., 11.8 kg of pure water and 47 g of 10% nitric acid were placed therein. Then, milling was carried out at a rotational speed of 30 rpm corresponding to 39% of the critical rotational speed of this container N$_C$=77 rpm for 18 hours. This afforded a cerium (IV) oxide aqueous slurry having solid content concentration of 33% by weight, pH 5.9 and conductivity of 318 μm/S. The powder obtained by drying this slurry at 300° C. had specific surface area of 7.1 m$^2$/g and BET method-based particle diameter of 117 nm. In addition, the particle diameter thereof was 100 to 300 nm with an observation by a scanning electron microscope, and the mean particle diameter was 260 nm according to centrifugal sedimentation method. Further, the proportion of small particles less than 30 nm was 1.5% and the BET method-based particle diameter of large particles was 140 nm. The proportion (%) that the particle diameter of the resulting particles fell within the mean particle diameter according to laser diffraction method ±30% was 66% in the whole particles. In addition, zirconium element was contained in 1300 ppm based on cerium (IV) oxide.

Example 2

Zirconia beads of 1 mmφ were placed in an amount of 135 kg in a ball mill container having polyethylene lining with a dimension of radius 15 cm×length 73 cm (in this point, H$_b$/r=1.4, amount of filled beads was 70%), and further 13.5 kg of the cerium oxide powder obtained by calcination at 1100° C. in Example 1, 27.0 kg of pure water and 107 g of 10% nitric acid were placed therein. Then, milling was carried out at a rotational speed of 35 rpm corresponding to 45% of the critical rotational speed of this container N$_C$=77 rpm for 16 hours. This afforded a cerium (IV) oxide aqueous slurry having solid content concentration of 33% by weight, pH 5.8 and conductivity of 350 μm/S. The powder obtained by drying this slurry at 300° C. had specific surface area of 7.3 m$^2$/g and BET method-based particle diameter of 114 nm. In addition, the particle diameter thereof was 100 to 300 nm with an observation by a scanning electron microscope, and the mean particle diameter was 280 nm according to centrifugal sedimentation method. Further, the proportion of small particles less than 30 nm was 1.3% and the BET method-based particle diameter of large particles was 138 nm. The proportion (%) that the particle diameter of the resulting particles fell within the mean particle diameter according to laser diffraction method ±30% was 63% in the whole particles. In addition, zirconium element was contained in 1200 ppm based on cerium (IV) oxide.

Example 3

Commercially available cerium carbonate powder having purity of 99.9% (mean particle diameter based on laser diffraction method of 38 μm) was calcined in an amount of 1600 g in an electric furnace at 350° C. for 5 hours, and then the temperature of the furnace was risen to 900° C. followed by calcination at 900° C. for 15 hours to obtain 800 g of yellow-white powder. The resulting powder was measured with X-ray diffraction apparatus and main peaks were detected at diffraction angle 2θ=28.6°, 47.5° and 56.4° which were consistent with characteristic peaks of cubic system crystalline cerium oxide described in ASTM card 34-394. An observation with a scanning electron microscope revealed that the calcined cerium oxide powder was aggregated particles having a primary particle diameter of 100 to 200 nm. In addition, the specific surface thereof was 4.6 m$^2$/g. The isoelectric point of the cerium (IV) oxide was pH=5.

To a mixed aqueous solution of 20 g of commercially available 25% tetramethylammonium hydroxide and 165 g of pure water, 21 g of 95% tetraethoxysilane was added with stirring by disper to obtain tetramethylammonium hydroxide silicate aqueous solution being an alkaline silicate having pH of 12.8, conductivity of 8110 μm/S and SiO$_2$ concentration of 2.9% by weight.

Partially stabilized zirconia beads of 1 mmφ were placed in an amount of 6 kg in a polyethylene container having a dimension of radius 6.5 cm×length 23 cm (in this point, H$_b$/r=1.2, amount of filled beads was 60%), and further 578 g of the resulting cerium oxide powder, 372 g of pure water and 206 g of tetramethylammonium hydroxide silicate aqueous solution corresponding to weight ratio (SiO$_2$)/(CeO$_2$) of 0.01 were placed therein. Then, milling was carried out at a rotational speed of 60 rpm corresponding to 50% of the critical rotational speed of this container N$_C$=120 rpm for 32 hours. After milling, beads-separation was carried out with pure water to obtain a cerium (IV) oxide aqueous slurry (A-1) having solid content concentration of 20% by weight, pH 11.9 and conductivity of 1734 μm/S. The resulting cerium (IV) oxide had the isoelectric point of pH 3.8. The powder obtained by drying this slurry at 300° C. had specific surface area of 15.2 m$^2$/g and BET method-based particle diameter of 55 nm. In addition, the particle diameter thereof was 100 to 200 nm with an observation by a scanning electron microscope, and the mean particle diameter was 113 nm according to laser diffraction method. The proportion (%) that the particle diameter of the resulting particles fell within the mean particle diameter according to laser diffraction method ±30% was 59% in the whole particles. The proportion of small particles less than 30 nm was 7.9% and the BET method-based particle diameter of large particles was 70 nm. In addition, zirconium element was contained in 2760 ppm based on cerium (IV) oxide.

Comparative Example 1

Zirconia beads of 1 mmφ were placed in an amount of 25.1 kg in a polyethylene container having a dimension of radius 15 cm×length 34 cm (in this point, H$_b$/r=0.66, amount of filled beads was 30%), and further 2.5 kg of the cerium oxide powder obtained in Example 1, 5.0 kg of pure water and 20 g of 10% nitric acid were placed therein. Then, milling was carried out at a rotational speed of 30 rpm corresponding to 39% of the critical rotational speed of this container N$_C$=77 rpm for 12 hours. This afforded a cerium (IV) oxide aqueous slurry having solid content concentration of 33% by weight, pH 5.9 and conductivity of 318 μm/S. The powder obtained by drying this slurry at 300° C. had specific surface area of 7.4 m$^2$/g and BET method-based particle diameter of 113 nm. In addition, the particle diameter thereof was 30 to 300 nm with an observation by a scanning electron microscope, and the mean particle diameter was 290 nm according to centrifugal sedimentation method. Further, the proportion of small particles less than 30 nm was 2.5% and the BET method-based particle diameter of large particles was 163 nm. The proportion (%) that the particle diameter of the resulting particles fell within the mean particle diameter according to laser diffraction method ±30% was 41% in the whole particles.

Comparative Example 2

Zirconia beads of 1 mmφ were placed in an amount of 169 kg in a nylon container having a dimension of radius 37 cm×length 73 cm (in this point, H$_b$/r=0.42, amount of filled beads was 15%), and further 16.7 kg of the cerium oxide powder obtained in Example 1, 33.8 kg of pure water and 134 g of 10% nitric acid were placed therein. Then, milling was carried out at a rotational speed of 12 rpm corresponding to 25% of the critical rotational speed of this container N$_C$=49 rpm for 13 hours. This afforded a cerium (IV) oxide aqueous slurry having solid content concentration of 33% by weight, pH 5.5 and conductivity of 248 μm/S. The powder obtained by drying this slurry at 300° C. had specific surface area of 7.2 m$^2$/g and BET method-based particle diameter of 116 nm. In addition, the particle diameter thereof was 25 to 300 nm with an observation by a scanning electron microscope, and the mean particle diameter was 290 nm according to centrifugal sedimentation method. Further, the proportion of small particles less than 30 nm was 3.0% and the BET method-based particle diameter of large particles was 168 nm. The proportion (%) that the particle diameter of the resulting particles fell within the mean particle diameter according to laser diffraction method ±30% was 39% in the whole particles.

Comparative Example 3

Zirconia beads of 1 mmφ were placed in an amount of 135 kg in a nylon container having a dimension of radius 15 cm×length 73 cm (in this point, H$_b$/r=1.4, amount of filled beads was 70%), and further 13.5 kg of the cerium oxide powder obtained in Example 1, 27.0 kg of pure water and 107 g of 10% nitric acid were placed therein. Then, milling was carried out at a rotational speed of 45 rpm corresponding to 58% of the critical rotational speed of this container N$_C$=77 rpm for 12 hours. This afforded a cerium (IV) oxide aqueous slurry having solid content concentration of 33% by weight, pH 6.3 and conductivity of 92 μm/S. The powder obtained by drying this slurry at 300° C. had specific surface area of 7.2 m$^2$/g and BET method-based particle diameter of 116 nm. In addition, the particle diameter thereof was 30 to 300 nm with an observation by a scanning electron microscope, and the mean particle diameter was 340 nm according to centrifugal sedimentation method. Further, the proportion of small particles less than 30 nm was 2.3% and the BET method-based particle diameter of large particles was 160 nm. The proportion (%) that the particle diameter of the resulting particles fell within the mean particle diameter according to laser diffraction method ±30% was 45% in the whole particles.

Comparative Example 4

Partially stabilized zirconia beads of 1 mmφ were placed in an amount of 6 kg in a polyethylene container having a dimension of radius 6.5 cm×length 23 cm (in this point, H$_b$/r=1.2, amount of filled beads was 60%), and further 578 g of the cerium oxide powder obtained by calcining in a similar condition as that of Example 3, 372 g of pure water and 206 g of tetramethylammonium hydroxide silicate aqueous solution prepared in Example 4 corresponding to weight ratio (SiO$_2$)/(CeO$_2$) of 0.01 were placed therein. Then, milling was carried out at a rotational speed of 90 rpm corresponding to 75% of the critical rotational speed of this container N$_C$=120 rpm for 16 hours. After milling, bead separation was carried out with pure water to obtain a cerium (IV) oxide aqueous slurry (B-1) having solid content concentration of 20% by weight, pH 11.3 and conductivity of 1725 μm/S. The powder obtained by drying this slurry at 300° C. had specific surface area of 15.0 m$^2$/g and BET method-based particle diameter of 56 nm. In addition, the particle diameter thereof was 30 to 300 nm with an observation by a scanning electron microscope, and the mean particle diameter was 113 nm according to laser diffraction method. The proportion (%) that the particle diameter of the resulting particles fell within the mean particle diameter according to laser diffraction method ±30% was 43% in the whole particles. The proportion of small particles less than 30 nm was 8.8% and the BET method-based particle diameter of large particles was 74 nm. In addition, zirconium element was contained in 2900 ppm based on cerium (IV) oxide.

TABLE 1

| | Item | | | | | | |
|---|---|---|---|---|---|---|---|
| | (I) | (II) | (III) | (IV) | (V) | (VI) | (VII) |
| Example 1 | 15 | 1.4 | 30 | 117 | 1.5 | 140 | 66 |
| Example 2 | 15 | 1.4 | 35 | 114 | 1.3 | 138 | 63 |
| Example 3 | 6.5 | 1.2 | 60 | 55 | 7.9 | 70 | 59 |
| Comparative Example 1 | 15 | 0.66 | 30 | 113 | 2.5 | 163 | 41 |
| Comparative Example 2 | 37 | 0.42 | 12 | 116 | 3.0 | 168 | 39 |
| Comparative Example 3 | 15 | 1.4 | 45 | 116 | 2.3 | 160 | 45 |
| Comparative Example 4 | 6.5 | 1.2 | 90 | 56 | 8.8 | 74 | 43 |

In table 1, item (I) is radius (cm) of ball mill container, item (II) is $H_b/r$ ratio, item (III) is rotational speed (rpm), item (IV) is BET method-based particle diameter (nm) of cerium oxide aqueous slurry, item (V) is proportion (%) of small particles less than 30 nm in the whole particles, item (VI) is BET method-based particle diameter of large particles, and item (VII) is proportion (%) in the whole particles that the particle diameter of the resulting particles fell within the mean particle diameter ±30%.

To aqueous sols (A-1, B-1) obtained in Example 3 and Comparative Example 4, ammonium polyacrylate was added in a concentration of 100% by weight based on cerium (IV) oxide, and then polishing compositions (a-1, b-1) were prepared by diluting the resulting mixture with pure water in a manner that the solid content of cerium (IV) oxide would be 1% by weight.

Polishing by means of the prepared polishing compositions was carried out as follows:

Polishing machine: a machine manufactured by Techno Rise Corporation;
Polishing pad: a polishing pad IC-1000 made of closed formed polyurethane resin (manufactured by Rodel Nitta Company);
Material to be polished: thermal oxidation layer on 4-inch silicon wafer;
Number of revolutions: 60 rpm;
Polishing pressure: 500 g/cm²; and
Polishing time: 2 minutes.

The assessment of polished faces shown in Table 2 were carried out with an optical microscope, in which the case where fine defects were observed was indicated by symbol (Δ) and the case where no defect was observed was indicated by symbol (◎).

TABLE 2

| | Removal rate (Å/min) | Polished Face |
|---|---|---|
| a-1 | 800 | ◎ |
| b-1 | 750 | Δ |

It can be pointed out that cerium oxide aqueous slurries in Examples 1 to 2 and Comparative Examples 1 to 3 shown in Table 1 have BET method-based particle diameter ranging form 113 to 117 nm which is approximately equal one another. However, the comparison between Examples 1 to 2 and Comparative Examples 1 to 2 reveals the followings. Comparative Examples 1 and 2 having a law ratio $H_b/r$ of depth $H_b$ of filled beads to radius r of the ball mill container (a law filling rate of beads) contain small particles less than 30 nm in a high rate in the whole particles, and the large particles thereof have a large BET method-based particle diameter and therefore they contain a large amount of large particles. Thus, it is understood that Comparative Examples 1 and 2 have a broader particle size distribution than Examples 1 and 2.

In addition, Comparative Example 3 in which a rotational speed of the ball mill container was adjusted to a high value has a high rate of small particles less than 30 nm in the whole particles and a large BET method-based particle diameter of large particles. Therefore, it is understood that Comparative Example 3 has a broad particle size distribution.

Example 3 containing tetramethylammonium hydroxide silicate aqueous solution as dispersant has a higher rate (%) in the whole particles of particles falling within mean particle diameter according to laser diffraction method ±30% than Comparative Example 4 in which a rotational speed of the ball mill container was adjusted to a high value. Therefore, it is understood that Example 3 has a narrow particle size distribution. In addition, it is understood that Example 3 contains has a narrow particle size distribution also from the facts that it contains small particles less than 30 nm in a low rate in the whole particles and has a small BET method-based particle diameter of large particles. Further, as shown in Table 2, it is understood from the comparison in polishing characteristics between Example 3 and Comparative Example 4 that Example 3 has a higher removal rate and provides a better quality of polished face.

Although a relationship between removal rate and smoothness of polished face is generally in an opposite manner, particles in cerium compound slurry obtained according to the present invention contain small particles less than 30 nm in a law rate of 10% or less in the whole particles and particles falling within mean particle diameter according to laser diffraction method ±30% in a high rate (%) of 50% or more in the whole particles, thereby the present invention makes it possible to provide a high removal rate and a good smoothness.

INDUSTRIAL APPLICABILITY

The present invention relates to a method of milling cerium (IV) oxide particles. The milling method of the present invention provides cerium oxide particles that contain a small amount of fine particles and large particles and have a sharp particle size distribution. Therefore, in case where the cerium oxide particle obtained according to the present invention are used as polishing agent for substrates containing silica as a main component, such as rock crystal, quartz glass for photomask, glass hard disk or oxidation layer of semiconductor devices, polished faces with a high accuracy and smoothness can be efficiently obtained with a high polishing speed and little scratch.

Further, in case where an aqueous sol containing cerium (IV) oxide particle covered with amorphous silica is used for particularly polishing substrates containing silica as a main component, such as rock crystal, quartz glass for photomask, glass hard disk or oxidation layer of semiconductor devices, it is hard to produce residues and a good polished surface can be obtained.

The invention claimed is:
1. A method of milling cerium compound, comprising:
  providing the cerium compound and a milling medium in a cylindrical ball mill container of a ball mill, the milling medium having a $H_b/r$ ratio between 1.2 and 1.9 where $H_b$ is the depth of the milling medium in the ball mill container and r is the radius of the ball mill container; and rotating the ball mill container at a rotational speed 50% or less of a critical rotational speed of the ball mill container, the critical rotation speed being defined as $N_c=299/r^{1/2}$ where $N_c$ is expressed in rpm and r is expressed in cm.

2. The method of milling cerium compound according to claim 1, wherein the milling of the cerium compound is carried out as a wet process.

3. The method of milling cerium compound according to claim 1, wherein the cerium compound is cerium oxide.

4. The method of milling cerium compound according to claim 3, wherein zirconium is used in an amount of 100 ppm to 10000 ppm based on cerium (IV) oxide.

5. The method of milling cerium compound according to claim 1, wherein the ball mill container is rotated at a rotational speed that is from 10% to 50% of the critical rotational speed $N_c$.

6. The method of milling cerium compound according to claim 1, wherein the radius r of the ball mill container is 5 to 50 cm.

7. The method of milling cerium compound according to claim 1, wherein the milling medium is partially stabilized zirconia ball.

8. The method of milling cerium compound according to claim 1, wherein the milling medium has a diameter of 0.3 to 25 mm.

9. The method of milling cerium compound according to claim 1, further comprising:
providing a water-soluble alkaline silicate; and
adjusting the pH of the resulting slurry containing the cerium compound to a pH from 8 to 13, wherein milling is carried out as a wet process to obtain the cerium compound covered with amorphous silica.

10. The method of milling cerium compound according to claim 9, wherein the water-soluble alkaline silicate is lithium silicate, sodium silicate, potassium silicate or quaternary ammonium hydroxide silicate.

11. The method of milling cerium compound according to claim 1, wherein the milling of the cerium compound is carried out as a dry process.

* * * * *